United States Patent [19]

Kalkman et al.

[11] Patent Number: 5,495,711
[45] Date of Patent: Mar. 5, 1996

[54] TUNER HOSE ASSEMBLY FOR POWER STEERING SYSTEM

[75] Inventors: Jesse Kalkman, Saginaw; Roy W. Heath, Davisburg; David F. Hammerbacher, Saginaw, all of Mich.

[73] Assignee: General Motors Corporation, Detroit, Mich.

[21] Appl. No.: 350,573

[22] Filed: Dec. 7, 1994

[51] Int. Cl.⁶ ............................................. F16D 31/02
[52] U.S. Cl. .......................... 60/469; 138/111; 138/26; 181/227; 417/312; 285/49
[58] Field of Search ........................ 60/469; 417/312; 138/111–114, 26; 181/227, 228; 285/49

[56] References Cited

U.S. PATENT DOCUMENTS

| | | | |
|---|---|---|---|
| 3,323,305 | 10/1964 | Klees | 60/52 |
| 4,285,534 | 8/1981 | Katayama et al. | 285/119 |
| 4,611,633 | 9/1986 | Buchholz et al. | 138/26 |
| 4,828,068 | 5/1989 | Wendler et al. | 180/148 |
| 5,094,271 | 3/1992 | Fritz et al. | 138/30 |
| 5,172,729 | 12/1992 | Vantellini | 138/26 |

*Primary Examiner*—F. Daniel Lopez
*Attorney, Agent, or Firm*—Saul Schwartz

[57] ABSTRACT

A tuner hose assembly for a motor vehicle power steering system including a flexible hose, a first flexible tuner tube inside the flexible hose having an upstream end connected to a pump, and a second flexible tuner tube inside the flexible hose having a downstream end connected to a power steering gear. A downstream end of the first flexible tuner tube is longitudinally separated from an upstream end of the second flexible tuner tube by a wave interference gap which terminates where an inner wall of the flexible hose is clamped against the upstream end of the second flexible tuner tube. The length of the second flexible tuner tube is selected, i.e. "tuned", to attenuate higher order pump fluid-borne noise and simulates a rigid metal tube of a prior tuner hose assembly having greater overall length.

4 Claims, 1 Drawing Sheet

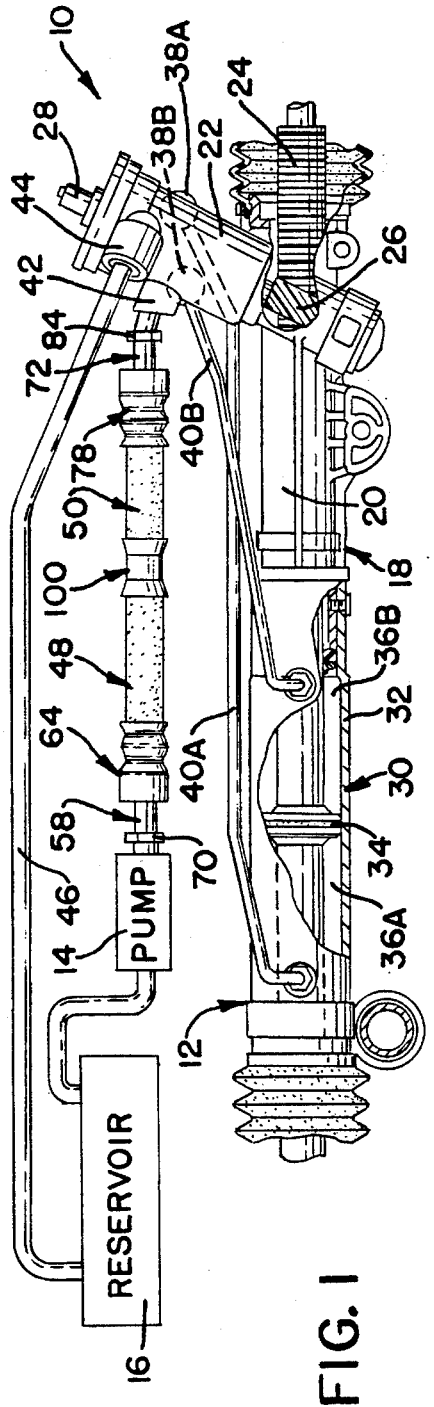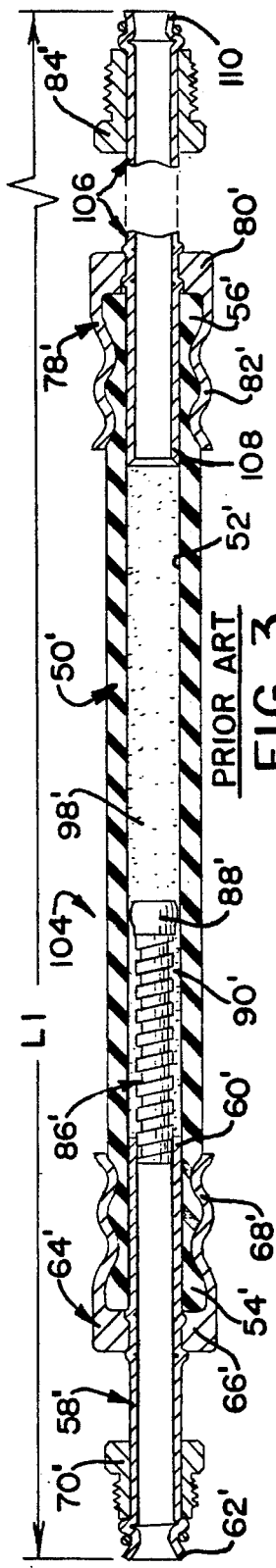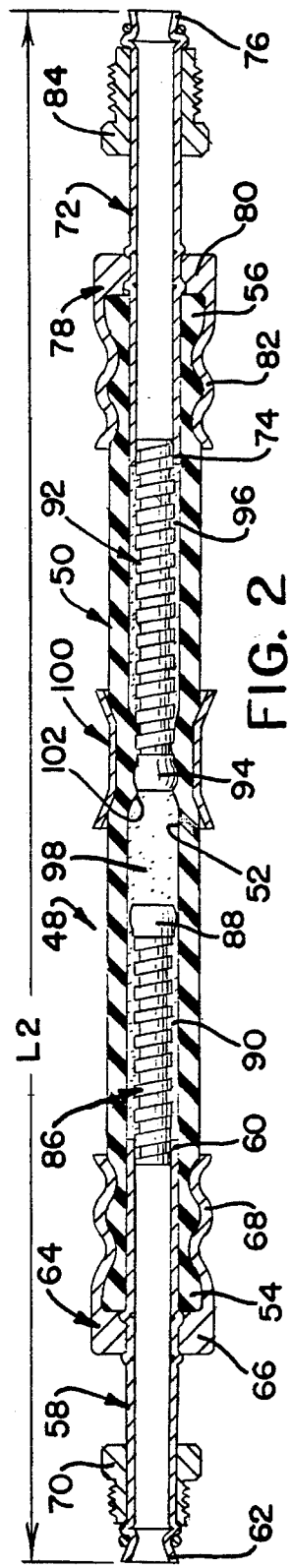

TUNER HOSE ASSEMBLY FOR POWER STEERING SYSTEM

FIELD OF THE INVENTION

This invention relates to devices for attenuating pump fluid-borne noise in motor vehicle power steering systems.

BACKGROUND OF THE INVENTION

Common motor vehicle power steering systems include a vane pump, a fluid motor, and a steering gear having a rotary valve for distributing fluid from the pump to the fluid motor. Pressure pulses emanate from the pump toward the steering gear when the vanes traverse the discharge port of the pump. In a pump having 10 vanes, for example, the frequency (Hz) of the pulses is 10× pump RPM/60. The frequency of higher order disturbances are harmonics of the basic frequency, i.e. 20× pump RPM/60, 30× pump RPM/60, etc., and are referred to as 20th order, 30th order, etc. pump fluid-borne noise. U.S. Pat. No. 3,323,305, issued 6 Jun. 1967 and assigned to the assignee of this invention, describes a tuner hose assembly for attenuating pump fluid-borne noise. In practice, it has been observed that attenuation of higher order pump fluid-borne noise requires proper selection, i.e. "tuning", of the length of a rigid tube through which the tuner hose assembly is connected to the steering gear. In one steering system, for example, 20th order pump fluid-borne noise (120Hz) was successfully attenuated using a rigid tube 7 inches long at the steering gear end of the tuner hose assembly. In other steering systems, with different pump and/or steering gear characteristics, comparably successful attenuation of 20th order pump fluid-borne noise has been observed to require a rigid tube at the steering gear end of the hose assembly too long to be conveniently accommodated in the space available in the vehicle.

SUMMARY OF THE INVENTION

This invention is a new and improved tuner hose assembly for a motor vehicle power steering system including a hydraulic pump, a fluid motor, and a steering gear having a control valve therein for directing pressurized fluid from the pump to the fluid motor. The tuner hose assembly according to this invention includes a flexible hose made of rubber or other elastomeric material, a first flexible tuner tube inside the rubber hose having an upstream end connected to the pump, and a second flexible tuner tube inside the rubber hose having a downstream end connected to the control valve of the power steering gear. A downstream end of the first flexible tuner tube is longitudinally separated from an upstream end of the second flexible tuner tube by a wave interference gap which terminates where an inner wall of the flexible hose is clamped against the upstream end of the second flexible tuner tube. The length of the second flexible tuner tube is selected, i.e. "tuned", to attenuate higher order pump fluid-borne noise and simulates the aforesaid rigid metal tube of prior tuner hose assemblies but in a tuner hose assembly have decreased overall length in comparison to prior tuner hose assemblies having comparable performance characteristics.

BRIEF DESCRIPTION OF THE DRAWINGS

FIG. 1 is a partially broken-away schematic view of a motor vehicle power steering system having a tuner hose assembly according to this invention;

FIG. 2 is an enlarged, longitudinal sectional view of a tuner hose assembly according to this invention; and FIG. 3 is similar to FIG. 2 but showing a prior art tuner hose assembly.

DESCRIPTION OF A PREFERRED EMBODIMENT

Referring to FIG. 1, a motor vehicle power steering system 10 includes a power assisted rack and pinion steering gear 12, a pump 14 driven by an engine, not shown, of the vehicle, and a reservoir 16. The steering gear has a housing 18 including a tubular rack support 20 and a valve housing 22. A rack bar 24 on the rack support 20 is shiftable back and forth in response to rotation of a pinion 26 on an input shaft 28 of the steering gear mounted on the valve housing. The input shaft 28 is connected to a manual steering wheel, not shown, of the vehicle and the opposite ends of the rack bar 24 are connected to steered wheels, not shown, of the vehicle.

A steering assist fluid motor 30 includes a cylinder 32 surrounding the rack bar and attached to one end of the rack support 20 and a piston 34 on the rack bar within the cylinder. The piston 34 cooperates with seals at the end of the cylinder 32 in defining a pair of working chambers 36A–B of the fluid motor. The working chambers 36A–B are connected to respective ones of a pair of cylinder ports 38A–B on the valve housing 22 by a pair of conduits 40A–B.

The valve housing 22 of the steering gear has a high pressure fluid inlet port 42 and a low pressure discharge port 44 thereon. The discharge port is connected to the reservoir 16 by a return conduit 46. A rotary control valve, not shown, such as described in U.S. Pat. No. 3,022,772, issued 27 Feb. 1962 and assigned to the assignee of this invention, is mounted in the valve housing 22 of the steering gear. When manual turning effort is applied to the input shaft 28, the rotary control valve connects one of the working chambers 36A–B to the inlet port 42 through the corresponding one of the conduits 40A–B and the other of the working chambers to the discharge port 44 through the other of the conduits 40A–B.

The pump 14 is an engine driven vane pump, such as described in U.S. Pat. No. 4,386,891, issued 7 Jun. 1983 and assigned to the assignee of this invention, characterized by pressure pulses or pump fluid-borne noise in the fluid discharge from the pump. Fluid is supplied to the pump at ambient pressure from the reservoir 16 through a supply conduit. Fluid at high pressure is transported from the pump to the inlet port 42 on the valve housing 22 of the steering gear through a tuner hose assembly 48 according to this invention.

The tuner hose assembly 48 includes a flexible hose 50 made of rubber or material with similar performance characteristics, such as elasticity and resistance to the effects of fuel and temperature, having an inner wall 52, an upstream end 54, and a downstream end 56. A first rigid metal tube 58 has an inboard end 60 inside the inner wall 52 of the hose 50 and a flared outboard end 62. The rigid tube 58 is attached in fluid-tight fashion to the upstream end of the flexible hose 50 by a fitting 64 having a body 66 around the tube between a pair of upset shoulders thereon and a skirt 68 crimped around the flexible hose to squeeze the latter against the rigid tube. A flare nut 70 behind the flared end 62 of the rigid tube 58 screws into an appropriate threaded bore in the pump for attaching the tuner hose assembly to a discharge port of the pump in fluid-tight fashion.

A second rigid metal tube 72 has an inboard end 74 inside the inner wall 52 of the hose 50 and a flared outboard end 76. The second rigid tube 72 is attached in fluid-tight fashion to the flexible hose 50 by a fitting 78 having a body 80 around the tube between a pair of upset shoulders thereon and a skirt 82 crimped around the flexible hose to squeeze the latter against the rigid tube. A flare nut 84 behind the flared end 76 of the rigid tube 72 screws into the inlet port 42 on the valve housing 22 of the steering gear 12 for attaching the tuner hose assembly to the inlet port in fluid-tight fashion.

A first flexible tuner tube 86 inside the flexible hose 50 having a downstream end defined by a cap 88 on the tuner tube is connected to the inboard end 60 of the first rigid tube 58 so that first tuner tube is connected directly to the discharge of the pump 14. An annular chamber 90 is defined between the tuner tube 86 and the inner wall 52 of the flexible hose. The first tuner tube may have any conventional construction, including a spiral wrapped flat ribbon, which affords the tube flexibility but which renders the tube radially inelastic.

A second flexible tuner tube 92 inside the flexible hose 50 having an upstream end defined by a cap 94 on the second tuner tube is connected to the inboard end 74 of the second rigid tube 72 so that the second tuner tube is connected directly to the inlet port 42 on the valve housing 22. An annular chamber 96 is defined between the second tuner tube 92 and the inner wall 52 of the flexible hose. The second tuner tube 92 may have any conventional construction, including a spiral wrapped flat ribbon, which affords the tuner tube flexibility and which defines a fluid leak path between the inside of the second tuner tube and the annular chamber 96 therearound, e.g., between the overlapped edges of the flat ribbon, but which renders the tube radially inelastic.

The end cap 88 on the first tuner tube 86 is separated from the end cap 94 on the second tuner tube 92 by a wave interference gap 98. A tubular sleeve 100 crimped around the flexible hose 50 squeezes the hose against the end cap 94 on the second tuner tube so that a downstream end 102 of a wave interference gap 98 is defined at the interface between the inner wall 52 of the flexible hose and the end cap 94 on the second tuner tube.

The tuner hose assembly 48 operates as follows. When the pump 14 is on, fluid flows from the pump through the first rigid tube 58 and the first tuner tube 86 into the wave interference gap 98. From the wave interference gap, the fluid is confined by the crimp sleeve to flow through the second tuner tube 92 and the second rigid tube 72 to the inlet port 42 on the valve housing 22. Pressure disturbances induced by the vanes of the pump 14 passing the discharge port thereof, i.e. pump fluid-borne noise, propagate through the first rigid tube 58 and the first tuner tube 86 and are attenuated in the wave interference gap by reflected waves propagating through the annular chamber 90.

With respect to pump fluid-borne noise not attenuated in the wave interference gap 98, e.g. 20th order pump fluid-borne noise, the pressure pulses thereof propagate into the second tuner tube 92. The fluid resistance and fluid inertance of the second tuner tube are comparable to the same characteristic of a rigid tube of the same length to attenuate the amplitude of the pressure pulses causing the aforesaid higher order pump fluid-borne noise.

The operation of the tuner hose assembly 48 is contrasted with that of a prior tuner hose assembly 104, FIG. 3, such as described in the aforesaid U.S. Pat. NO. 3,323,305. Referring to FIG. 3, wherein structure common to both the tuner hose assembly 48 and the prior tuner hose assembly 104 is identified by primed reference characters, the tuner hose assembly 104 includes a flexible hose 50' made of rubber or similar material having an inner wall 52', an upstream end 54' and a downstream end 56'. A first rigid metal tube 58' has an inboard end 60' inside the inner wall 52' of the hose 50' and a flared outboard end 62'.

The rigid tube 58' is attached in fluid-tight fashion to the flexible hose 50' by a fitting 64' having a body 66' around the tube between a pair of upset shoulders thereon and a skirt 68' crimped around the flexible hose to squeeze the latter against the rigid tube. A flare nut 70' behind the flared end 62' of the rigid tube 58' screws into an appropriate threaded bore in the pump for attaching the tuner hose assembly 104 to the pump 14 in fluid-tight fashion.

A second rigid metal tube 106, longer than the rigid metal tube 72 of the tuner hose assembly 48, has an inboard end 108 inside the inner wall 52' of the hose 50' and a flared outboard end 110. The second rigid tube 106 is attached in fluid-tight fashion to the flexible hose 50' by a fitting 78' having a body 80' around the tube between a pair of upset shoulders thereon and a skirt 82' crimped around the flexible hose to squeeze the latter against the rigid tube. A flare nut 84 behind the flared end 110 of the rigid tube 106 screws into the inlet port 42 on the valve housing 22 of the steering gear 12 for attaching the tuner hose assembly 104 to the inlet port in fluid-tight fashion.

A flexible tuner tube 86' inside the flexible hose 50' is connected to the inboard end 60' of the rigid tube 58' and has a downstream end defined by an end cap 88' on the tuner tube. An annular chamber 90' is defined between the tuner tube 86' and the inner wall 52' of the flexible hose. The tuner tube 86' may have any conventional construction, including a spiral wrapped flat ribbon, which affords the tube flexibility but which renders the tuner tube substantially radially inelastic. A wave interference gap 98' is defined between the downstream end of the tuner tube 86' and the inboard end 108 of the second rigid tube.

The tuner hose assembly 104 operates as follows. When the pump 14 is on, fluid flows from the pump through the first rigid tube 58' and the tuner tube 86' into the wave interference gap 98'. From the wave interference gap, the fluid flows out through the second rigid tube 106 to the inlet port 42 of the steering gear 12. Pressure disturbances induced by the vanes of the pump passing the discharge port thereof propagate through the first rigid tube 58' and interact in the wave interference gap 98' with reflected pressure waves for attenuation of pump fluid-borne noise.

With respect to pump fluid-borne noise not attenuated in the wave interference gap 98', e.g. 20th order pump fluid-borne noise, the pressure pulses thereof propagate through the flexible hose 50' into the second rigid tube 106 in the fluid flowing downstream through the latter. The length of the second rigid tube 106 is selected or "tuned" so that the fluid resistance and fluid inertance thereof attenuates the amplitude of such higher order pump fluid-borne noise to acceptable levels. In some applications, an overall length dimension L1 of the tuner hose assembly, FIG. 3, required for attenuation of higher order pump fluid-borne noise may inhibit installation of the tuner hose assembly 104 due to insufficient space between the pump and the steering gear.

The tuner hose assembly 48 according to this invention will have an overall length dimension L2, FIG. 2, less than the length dimension L1 of the prior tuner hose assembly 104 having comparable performance characteristics due to placement of the second tuner tube 92 inside the flexible hose 50 in the space otherwise allocated to the wave interference gap 98 of the prior tuner hose assembly. It is believed that comparable performance characteristics of the tuner hose assemblies 48, 104 are achieved because the radial stiffness of the second tuner tube 92 imparts fluid resistance and fluid inertance to the tuner hose assembly comparable to that of the long rigid tube 106 in the prior tuner hose assembly while fluid leakage through the second tuner tube 92 into the annular chamber 96 therearound renders the fluid capacitance of the tuner hose assembly 48 similar to that achieved by the longer wave interference gap 98' in the prior tuner hose assembly 104.

The embodiments of the invention in which an exclusive property or privilege is claimed are defined as follows:

1. A tuner hose assembly comprising:

a flexible elastomeric hose having a cylindrical inner wall surface, a first flexible and radially inelastic tuner tube inside of said flexible hose cooperating with said cylindrical inner wall thereof in defining a first annular chamber between said first tuner tube and said cylindrical inner wall, means connecting said first tuner tube at a first end thereof to a pump discharge and closing a first end of said first annular chamber, a second flexible and radially inelastic tuner tube inside of said flexible hose cooperating with said cylindrical inner wall thereof in defining a second annular chamber between said second tuner tube and said cylindrical inner wall, means connecting a first end of said second tuner tube to a steering gear inlet port and closing a first end of said second annular chamber, a second end of said second tuner tube being longitudinally separated from a second end of said first tuner tube by a wave interference gap within said flexible hose open to said first annular chamber, closure means closing said second annular chamber at said second end of said second tuner tube and defining a fluid seal between said second annular chamber and said wave interference gap, and means defining a fluid leak path from inside of said second tuner tube to said second annular chamber.

2. The tuner hose assembly recited in claim 1 wherein said closure means closing said second annular chamber at said second end of said second tuner tube and defining a fluid seal between said second annular chamber and said wave interference gap includes:

a sleeve permanently deformed against a cylindrical outer wall of said flexible hose squeezing said cylindrical inner wall thereof against said second tuner tube at said second end thereof.

3. The tuner hose assembly recited in claim 2 wherein said means connecting said first end of said first tuner tube to said pump and closing said first end of said first annular chamber includes:

a first rigid tube having an inboard end inside of said cylindrical inner wall of said flexible hose and an outboard end outside of said cylindrical inner wall of said flexible hose, means connecting said inboard end of said first rigid tube to said first end of said first tuner tube, and a first fitting having a tubular skirt permanently deformed around said cylindrical outer wall of said flexible hose squeezing said cylindrical inner wall thereof against said first rigid tube.

4. The tuner hose assembly recited in claim 3 wherein said means connecting said first end of said second tuner tube to said steering gear inlet port and closing said first end of said second annular chamber includes:

a second rigid tube having an inboard end inside of said cylindrical inner wall of said flexible hose and an outboard end outside of said cylindrical inner wall of said flexible hose, means connecting said inboard end of said second rigid tube to said first end of said second tuner tube, and a second fitting having a tubular skirt permanently deformed around said cylindrical outer wall of said flexible hose squeezing said cylindrical inner wall thereof against said first rigid tube.

* * * * *